C. J. REHLIN.
OPTICAL ILLUSION AMUSEMENT APPARATUS.
APPLICATION FILED AUG. 16, 1913.

1,098,761.

Patented June 2, 1914.

5 SHEETS—SHEET 3.

Witnesses
F. E. Gaither
Lois Wineman

Inventor
Charles J. Rehlin
By W. G. Doolittle
Attorney

C. J. REHLIN.
OPTICAL ILLUSION AMUSEMENT APPARATUS.
APPLICATION FILED AUG. 16, 1913.
1,098,761.
Patented June 2, 1914.
5 SHEETS—SHEET 4.
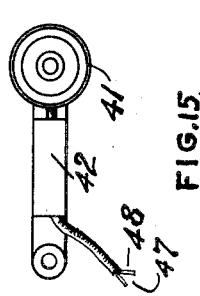
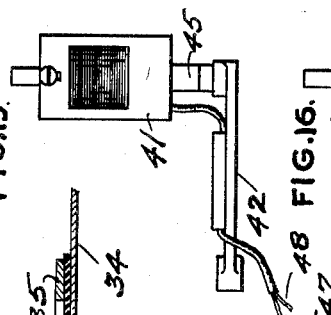
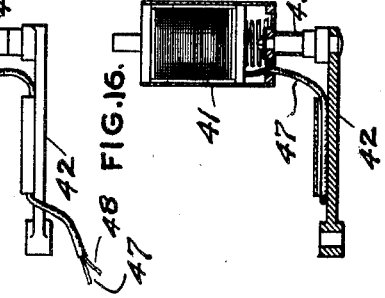
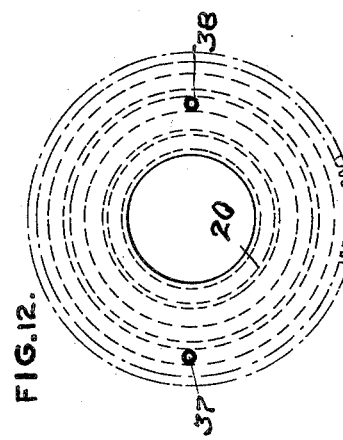
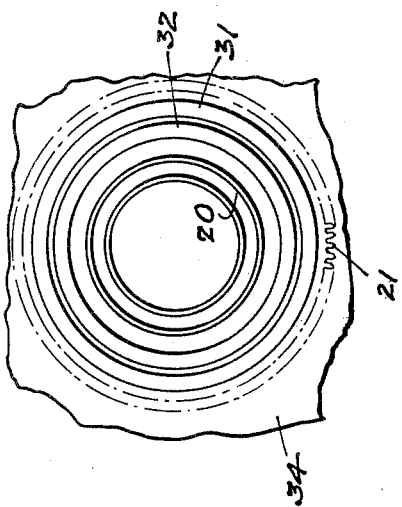
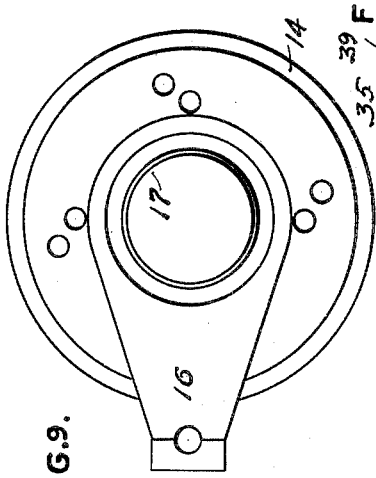
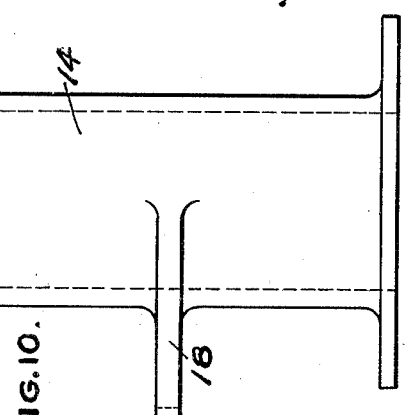

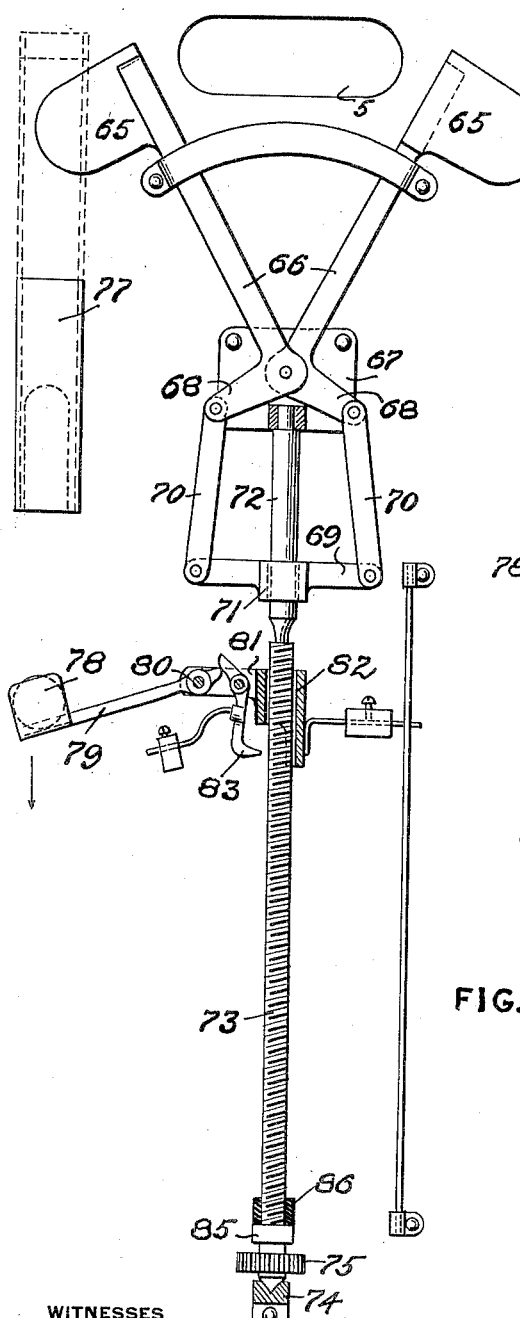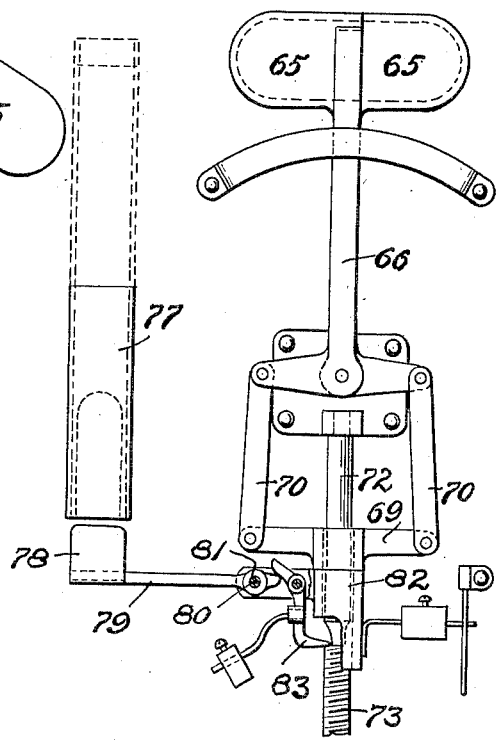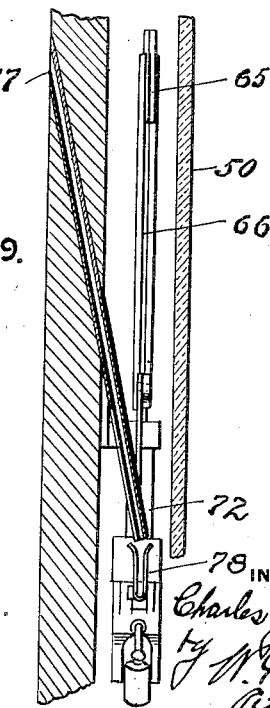

UNITED STATES PATENT OFFICE.

CHARLES J. REHLIN, OF PITTSBURGH, PENNSYLVANIA.

OPTICAL-ILLUSION AMUSEMENT APPARATUS.

1,098,761.     Specification of Letters Patent.     Patented June 2, 1914.

Application filed August 16, 1913. Serial No. 785,051.

*To all whom it may concern:*

Be it known that I, CHARLES J. REHLIN, a citizen of the United States, residing at Pittsburgh, in the county of Allegheny and State of Pennsylvania, have invented certain new and useful Improvements in Optical-Illusion Amusement Apparatus, of which the following is a specification.

The prime object of my invention is to provide an optical illusion amusement apparatus, and more particularly, an apparatus of the character described including a casing having one or more observation openings therein, a reflecting surface disposed within the casing, and a series of movable figures arranged in such a manner with relation to the reflecting surface that by observing the reflections of the moving figures, the figures will appear greatly multiplied.

Figure 1:
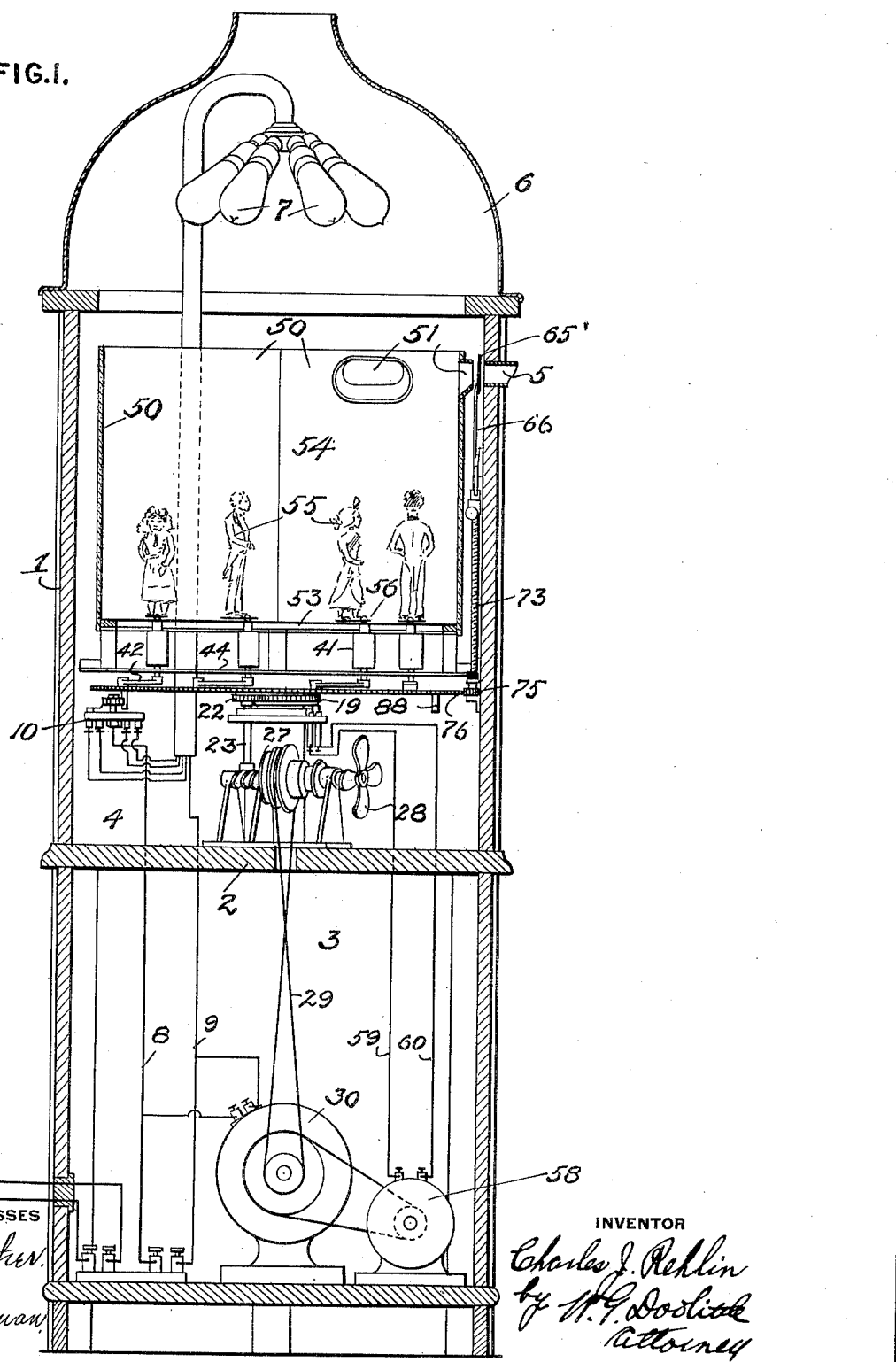
Figure 2:
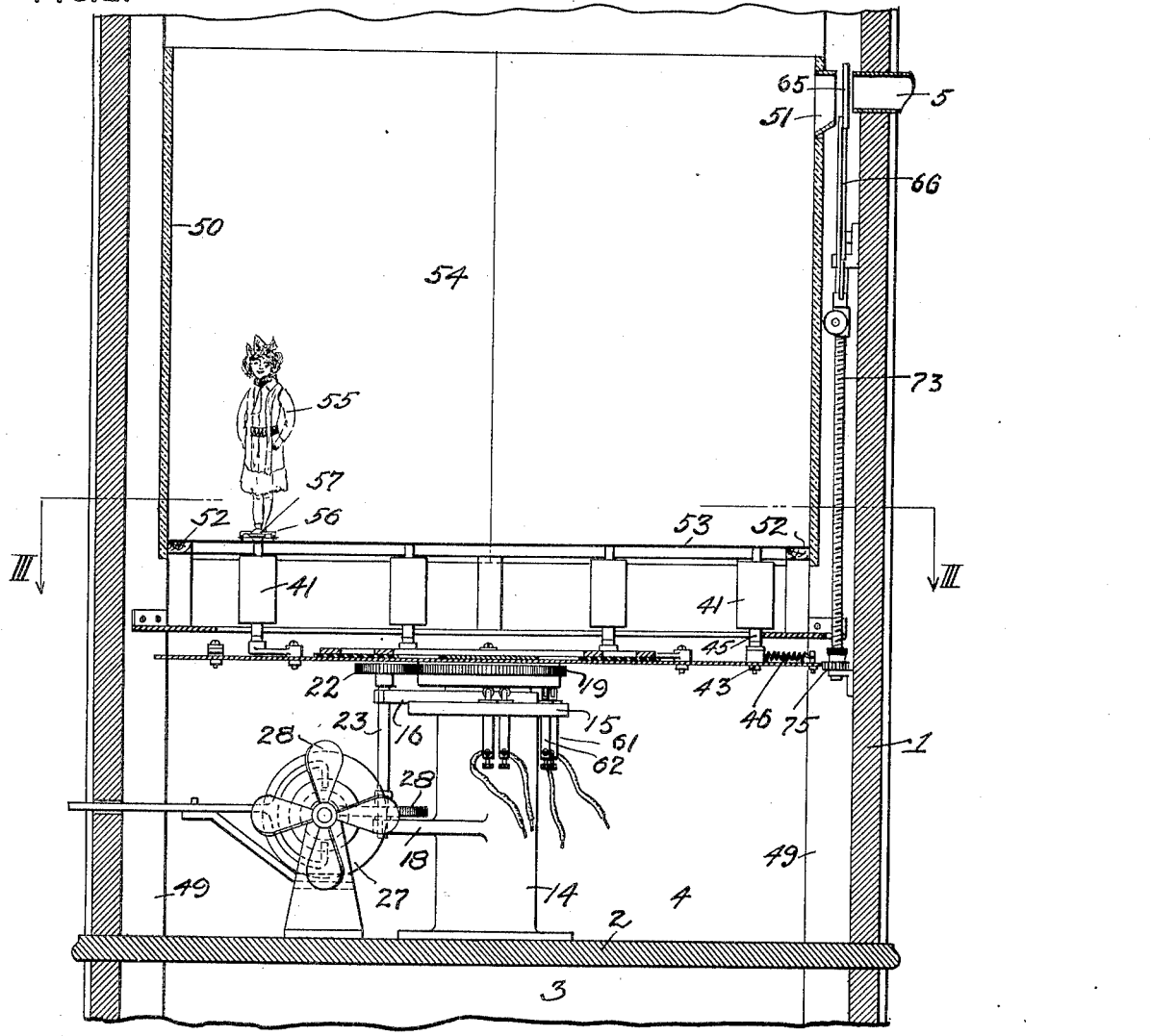
Figure 3:
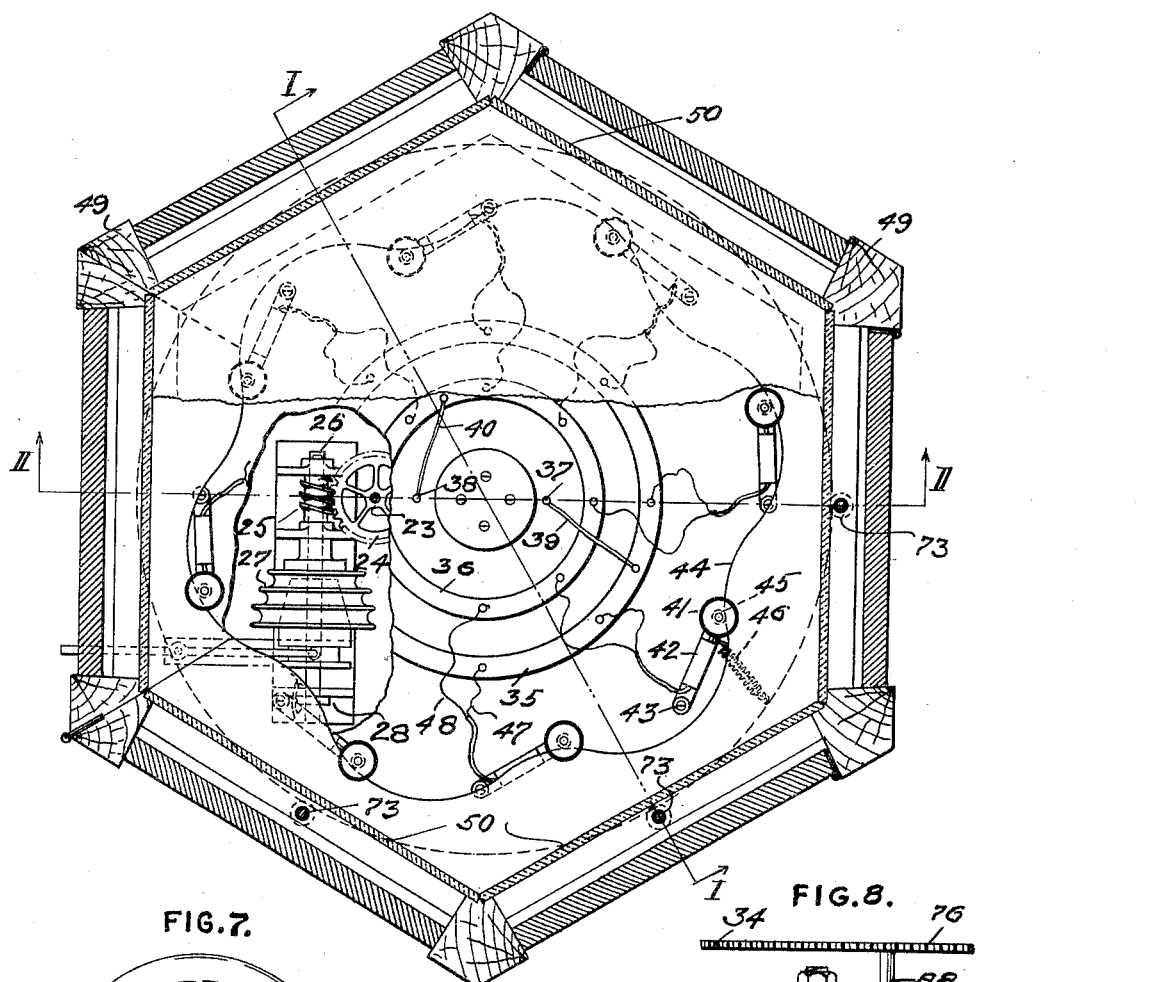
Figure 7:
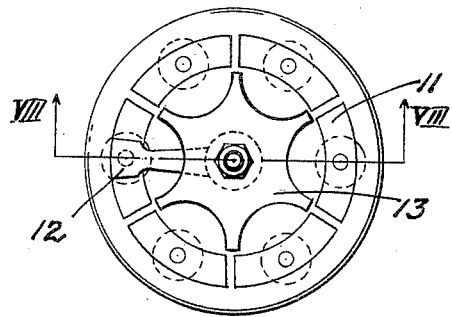
Figure 8:
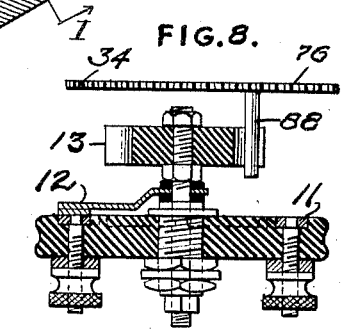

In the accompanying drawings, which illustrate an application of my invention, Figure 1 is a vertical sectional view, the section being taken on line I—I of Fig. 3; Fig. 2, an enlarged vertical sectional view of a portion of the apparatus, the section being taken on line II—II of Fig. 3; Fig. 3, a part horizontal section and a part plan, the section being taken on line III—III of Fig. 2; Fig. 4, detailed views of a carriage on which the figures are mounted; Fig. 5, a sectional view of the same; Fig. 6, detailed views of electrical contact members; Fig. 7, a plan of an electric switch; Fig. 8, a vertical sectional view of same taken on line VIII—VIII of Fig. 7; Fig. 9, a top plan of a standard; Fig. 10, a side elevational view of the same; Fig. 11, an enlarged vertical sectional view particularly showing a portion of a revoluble magnet carrying plate, and electrical contact rings; Fig. 12, a top plan of a toothed wheel employed; Fig. 13, a bottom plan of the construction shown by Fig. 11; Figs. 14, 15, and 16, respectively plan, elevational and part sectional views of an electro-magnet and its connections; Fig. 17, an elevational view showing an observation opening and closure means therefor and mechanism for operating the closure means or shutter; Fig. 18, a view similar to Fig. 17 showing the shutter in a closed position over the observation opening; and, Fig. 19, a sectional view particularly showing a coin slot in connection with means coöperating with the shutter actuating mechanism.

Referring to the drawings, 1 designates a casing of any suitable construction. As illustrated and as preferred, the casing is divided by a horizontally disposed partition 2 into a lower compartment 3 and an upper compartment 4. The casing is also provided with a series of observation openings 5 and a dome 6, the latter being adapted to receive a cluster of electric lamps 7, the lamps in practice being provided with different colored bulbs for the purpose of throwing lights of different colors into the interior of the casing.

The lamps are supplied with electricity through the wires 8 and 9 leading from a suitable source of electricity to the lamps, and 10 designates a switch designed to control the respective lamps. This switch 10 is particularly shown by Figs. 7 and 8 of the drawings. As illustrated, the switch includes a divided ring 11 with each section thereof in electrical circuit with one of the lamps, a revoluble contact member 12, and a toothed insulated wheel 13. The function and operation of this switch will be more fully hereinafter described.

Supported by and extending upwardly from the horizontal partition 2, I provide a standard or support 14, said support being provided with a circular plate 15, an outwardly projecting arm 16, a centrally disposed circular projection 17, and an arm 18. Standard 14 is adapted to support a toothed wheel 19, the hub portion 20 of which is designed to encircle the projection 17 of standard 14, and interposed between said wheel 19 and the standard, I provide a roller bearing construction.

The teeth 21 of wheel 19 are adapted to mesh with a gear 22 mounted on the upper end of a vertically extending shaft 23, the lower end of said shaft 23 being provided with a wheel 24, the teeth of which are adapted to mesh with a worm 25 carried on a horizontally disposed drive shaft 26. Said shaft 26 is provided with a series of pulley wheels 27 and a fan 28, and is driven by means of a belt connection 29 leading from said pulley wheels to an electric motor 30, the latter being suitably supported in the lower compartment 3 of the casing.

Secured to wheel 19 and adapted to rotate therewith, I provide two separate electric conducting rings 31 and 32, said rings 31 and 32 being insulated from each other and from the wheel 19 by suitable insulating material 33. Located on said wheel 19 and adapted to be carried thereby, I provide a revoluble magnet carrying plate or disk 34. Plate 34 carries contact strips or rings 35 and 36 insulated therefrom and respectively in electrical connection with rings 31 and 32, as particularly shown by Fig. 11, by means of posts 37 and 38 and wires 39 and 40.

Pivotally supported on the plate 34 is a series of electro-magnets 41, said magnets being connected with the plate 34 by means of arms 42 and pins 43. Suitably supported from the casing, I provide an irregularly curved plate 44 against which the rollers 45 of the respective electro-magnet posts bear, and for the purpose of maintaining the rollers on the posts aforesaid in contact with the irregularly curved plate 44, I provide springs 46.

From the foregoing, it will be noted that the several electro-magnets revolve with the plate 34, and owing to the irregularly curved plate 44, said magnets will have an irregular movement independent of said plate 34. Each of the magnets is connected with contact rings 35 and 36 by wires 47 and 48, particularly shown in Fig. 3.

Located within the casing and preferably supported by posts 49, which posts also support the sectional casing, I provide a reflecting surface made up as shown of a series of mirrors 50. One or more sections of the reflecting member or members is provided with an observation opening 51 designed to register with the observation opening 5 of the casing.

Located within the reflecting members or reflecting surface and supported upon a ring 52, is a circular piece of cloth or other suitable fabric or material 53. Within the chamber 54 formed by the reflecting members 50, I provide a series of magnetically controlled figures 55, said figures being mounted on carriages 56. Each of the carriages 56 is provided with a ball 57, the latter being adapted to be attracted by and moved by the magnets 41.

Electricity is supplied to the several magnets from a generator 58, which generator in turn is run by the electric motor 30 (see Fig. 1), the current being led through wires 59 and 60 to the magnets through electrical connections 61, 62, the latter projecting through openings formed in the plate member 15 of the standard 14, said electrical connectors 61 and 62 being provided with contact rollers 63 and 64 respectively designed to make contact with the contact rings 31 and 32 carried by wheel 19, and from said contact rings 31 and 32 as above described.

The observation openings 5 of the casing and 51 of the reflecting surface are controlled by a closure device, as illustrated, comprising a two-part shutter or closure including pivotally supported members 65, said members 65 being secured to or made integral with downwardly depending arms 66 pivotally secured at their lower ends to a plate 67, said arms 66 having extensions 68, and being adapted to be connected with a cross member 69 by means of links 70. Cross member 69 is provided with a centrally disposed apertured portion 71 through which the upper end 72 of a vertically extending screw shaft 73 extends. Shaft 73 at its lower end is mounted in a bearing 74 and is provided with a small gear 75 adapted to mesh with the teeth 76 formed on the periphery of revoluble plate 34. In practice, plate 34 is continuously revolved and in turn continuously rotates shaft 73.

Fig. 18 shows the observation opening closed. By dropping a coin through a coin receiving slot 77, the coin comes into engagement with a coin receiving member 78 located on an end of rod 79, the latter being pivotally connected at 80 with a projection 81 of a sleeve 82, said sleeve being loosely mounted on the vertical screw shaft 73. 83 designates a weighted dog pivotally secured to projection 81 of sleeve 82 and having an end thereof adapted to engage an end of rod 79 and its opposite end adapted to engage the upper end of screw shaft 73.

As illustrated, it will be seen that a coin coming into contact with the coin receiving member 78 will depress said member, thereby releasing the weighted dog 83 from contact with the upper end of screw shaft 73 permitting sleeve 82 to drop to the bottom of said shaft discharging the coin and causing the end 84 of dog 83 to engage the threads of screw shaft 73. As soon as the sleeve 82 descends, the cross member 69 resting on said sleeve will drop from the position shown in Fig. 18 to the position shown in Fig. 17, thereby spreading the members 65 and permitting an observation of the interior of the apparatus.

For the purpose of limiting the downward movement of the sleeve on the screw shaft 73, I provide an adjustable collar 85 having an elastic or yielding ring member 86 against which the sleeve makes contact after it drops from its elevated position. Owing to the fact that the end 84 of the dog 83 is in engagement with the threads of the continuously revolving shaft 73, the sleeve 82 will be caused to travel up said shaft, for the purpose of closing the observation opening, until the upper end of the screw-threaded portion is reached, after which the end 84 will be in contact with the reduced or cutaway portion 87 of shaft 73, thus maintaining the sleeve and its connected parts in the position shown by Fig. 18 until another coin is inserted in the machine.

Plate 34 is provided with a series of depending posts 88 adapted, upon rotation of the plate 34, to successively make contact with the teeth of wheel 13 of the electrical switch, thereby controlling the several lamps 7 for the purpose of changing the color of the light, as above mentioned.

What I claim is:—

1. In an apparatus of the character described, a reflecting member, a series of magnetically controlled figures arranged within the reflecting member, and a series of coöperating magnets.

2. In an apparatus of the character described, a reflecting member, a series of magnetically controlled figures arranged within the reflecting member, a series of coöperating magnets, and operable means for moving the magnets.

3. In an apparatus of the character described, a reflecting member, a series of magnetically controlled figures arranged within the reflecting member, a series of electro-magnets, a revoluble member carrying the electro-magnets, and operable means for revolving the carrying member.

4. In an apparatus of the character described, a reflecting member, a series of magnetically controlled figures arranged within the reflecting member, a series of electro-magnets, a revoluble member carrying the electro-magnets, a series of electric lamps, a source of electricity, an electric switch controlling said lamps, means on the carrying member for actuating the switch, and operable means for revolving the carrying member.

5. In an apparatus of the character described, a casing having an observation opening therein, a reflecting member in the casing, a series of magnetically controlled figures arranged within the reflecting member, a series of coöperating magnets, a revoluble member carrying the magnets, a shutter for the said opening, means for operating the shutter connected with the revoluble carrying member, and operable means for revolving the carrying member.

6. In an apparatus of the character described, a series of mirrors constituting a reflecting surface, a series of magnetically controlled figures arranged within the reflecting surface, a series of electro-magnets, a revoluble member carrying the electro-magnets, means for imparting a movement to the magnets independent of the revoluble member, and operable means for revolving the carrying member.

7. In an apparatus of the character described, a series of mirrors forming a reflecting surface, a series of magnetically controlled figures arranged within the reflecting surface, a series of electro-magnets, a revoluble member carrying the electro-magnets, means for pivotally securing the magnets to the carrying member, means for moving the magnets independently of the movement of the revoluble carrying member, and operable means for revolving the carrying member.

In testimony whereof I affix my signature in presence of two witnesses.

CHARLES J. REHLIN. [L. S.]

Witnesses:
W. G. DOOLITTLE,
F. E. GAITHER.

Copies of this patent may be obtained for five cents each, by addressing the "Commissioner of Patents, Washington, D. C."